United States Patent
Chakraborty et al.

[19]

[11] Patent Number: 5,995,659
[45] Date of Patent: *Nov. 30, 1999

[54] METHOD OF SEARCHING AND EXTRACTING TEXT INFORMATION FROM DRAWINGS

[75] Inventors: Amit Chakraborty, Cranbury; Peiya Liu, East Brunswick; Liang H. Hsu, Robbinsville, all of N.J.

[73] Assignee: Siemens Corporate Research, Inc., Princeton, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/926,217

[22] Filed: Sep. 9, 1997

[51] Int. Cl.⁶ .................................................. G06K 9/34
[52] U.S. Cl. .......................................... 382/176; 382/281
[58] Field of Search .................................... 382/172, 176, 382/177, 190, 202, 205, 262, 281, 171, 193, 197; 358/462, 464, 453; 707/501, 502, 513, 530, 531, 504

[56] References Cited

U.S. PATENT DOCUMENTS

| | | | |
|---|---|---|---|
| 5,202,933 | 4/1993 | Bloomberg | 382/176 |
| 5,680,479 | 10/1997 | Wang et al. | 382/176 |
| 5,809,317 | 9/1998 | Kogan et al. | 707/501 |
| 5,872,864 | 2/1999 | Imade et al. | 382/176 |

OTHER PUBLICATIONS

Nagy et al., "A Prototype Document Image Analysis System for Technical Journals", IEEE, Jul. 1992, pp. 10–22.

*Primary Examiner*—Phuoc Tran
*Attorney, Agent, or Firm*—Donald B. Paschburg

[57] ABSTRACT

A method for recognizing text in graphical drawings includes creating a binarized representation of a drawing to form an electronic image of pixels. The image is discriminated between text regions and lines in the image by grouping pixels into blocks and comparing blocks with a predetermined format to identify text regions. The lines that remain in the text regions are removed to create text only regions. The text is recognized in the text only regions.

20 Claims, 4 Drawing Sheets

METHOD OF SEARCHING AND EXTRACTING TEXT INFORMATION FROM DRAWINGS

BACKGROUND

1. Field of the Invention

This disclosure relates to a method for extracting text information and, more particularly, to search documents and drawings for text characters mixed with graphics.

2. Description of the Related Art

Effective and automated creation of hypermedia have recently received immense focus due to the high demand for hypermedia applications generated as a result of the huge and growing popularity of the World Wide Web (WWW). Unfortunately, the creation of hypermedia to date continues to be a laborious, manually intensive job and in particular the task of referencing content in drawing images to other media. In a majority of cases, the hypermedia authors have to locate anchored information units (AIU's) or hotspots (areas or keywords of particular significance) which are then appropriately hyperlinked to relevant information. In an electronic document the user can retrieve associated detailed information by mouse clicking on these hotspots as the system interprets the associated hyperlinks and fetches the corresponding information.

Extraction of AIUs is of enormous importance for the generation of hypermedia documents. However, achieving this goal is nontrivial from raster images. This is particularly true in the case of scanned in images of engineering documents which primarily consist of line drawings of mechanical parts with small runs of text indicating the part or group number. Scanned-in mechanical drawings have machine parts that are labeled by text strings. These text strings point to the relevant machine parts. One way to create an index for the machine parts would be to point on the associated text. Obviously, the areas of interest to the hypermedia author and to the end user are those text strings that identify the part numbers or other related document information. This is also important within the scope of making drawings more content referable in electronic documents.

What makes this problem challenging is the indistinguishability of text from polylines which constitute the underlying line drawings. This also partially explains the paucity of reliable products that can undertake the above-mentioned task. While developing a general fit-for-all algorithm that would work for all kinds of line-drawing images is almost impossible, solutions can be achieved by making use of underlying structures of the concerned documents.

Currently, most available methods cannot be used reliably for drawing images. They can primarily be categorized as follows: (a) raster-to-vector converters and (b) traditional OCR methods mainly used for text documents. Due to the similarity between text and polylines, extraction of text from line drawings is a very difficult task. While the raster to vector converters treat the whole image as consisting of line drawings only, the OCR software packages presume the whole image is text. In the first case text is converted to line drawings, in the second case line drawings are attempted to be interpreted as text. While the first category of products is clearly irrelevant within the present context, the second category leaves the task of culling out the relevant material from all the "junk" that it produces as a result of misreading line drawings as text.

Several prior art software packages fall within this category. While they can both accomplish some preprocessing like image despeckeling and enhancement, proper interpretation of text within the context of line drawing images needs the user to manually outline the text regions, which is tedious and time consuming.

Therefore, a need exists for an automated method to locate keywords in engineering drawings and documents to create proper AIUs for cross-referencing in hypermedia documents. Most of the suggested prior art methods do not optimally use the underlying geometry and domain-specific knowledge to achieve the task of text separation. It is desirable for the above-mentioned method to make use of the geometry and length of the text strings that are to be identified in order to localize them. These localized regions are then analyzed using an OCR software to extract the exact text content. Further, the method must be amenable to user manipulation and input to adapt to the variability of the class of documents under consideration. The friendly user interface should also allow corrections at different stages of the procedure.

SUMMARY OF THE INVENTION

A method for recognizing text in graphical drawings includes creating a binarized representation of a drawing to form an electronic image of pixels. The image is discriminated between text and lines in the image by grouping pixels into blocks and comparing blocks with a predetermined format to identify possible text regions. The lines that remain in the text regions are removed to create text only regions. The text is recognized within the text only regions. The removal of lines can be performed in stages. For example, a coarse line removal can occur prior to the discrimination of text and lines and a fine line removal can be performed after potential text regions are identified.

In particularly preferred embodiments the step of optically scanning the drawing is included. Creating a binarized representation may include the steps of comparing pixel values to a grey-scale threshold value and assigning the pixels to be either white or black. Discriminating between text regions and graphical lines may include the steps of determining a distance between each pixel and nearest neighhboring pixels, comparing each distance to a predetermined distance and assigning labels to pixels within the predetermined distance to form pixel blocks having the same label, and comparing pixel blocks to predetermined text formats for identifying text regions. Once text regions are identified graphical lines may be removed by subdividing the drawing space into a grid defining grid spaces, counting black pixels associated with text and graphics lines in each grid space, comparing a count of black pixels to a predetermined count for determining if the grid space contains a line and removing lines by changing black pixels to white pixels.

Alternate embodiments include the step of recognizing lines in the text only regions by using optical character recognition software. The method may further include the step of cleaning up the image by median filtering and the step of creating anchorable information units for hypertext creation.

BRIEF DESCRIPTION OF THE DRAWINGS

The invention will be described in detail in the following description of preferred embodiments with reference to the following figures wherein.

DETAILED DESCRIPTION OF PREFERRED EMBODIMENTS

The present disclosure describes an automated method to locate keywords in engineering drawings to create proper anchorable information units (AIU's) or hotspots (areas or keywords of particular significance) which are then appropriately hyperlinked to relevant information. The method provides an integrated image processing and OCR technique for a superior handling of mixed text/graphic (MTG) images of documents or engineering drawings. Image processing techniques are used to first ready the image for further processing by binarizing it and removing all probable lines, creating a binarized line-removed (BLR) image. Mixed Text/Graphic (MTG) regions are then extracted from raster images of engineering drawings, which are then filtered to extract the Filtered Text (FT) Regions. Existing OCR technology is used only on these areas. This avoids blindly applying OCR to non-textual areas and guarantees increased efficiency. The method can precisely identify the proper areas (FT Regions) to apply OCR technology in this drawing AIU extracting process. This is crucial for successful extraction of text runs identifying part numbers and other relevant information from raster images of engineering drawings. The existing products do not presently have such a capability. This method has a systematic approach that automatically extracts the relevant text from images of paper drawings. The method further allows user input to aid in tailoring the results.

Figure 1:
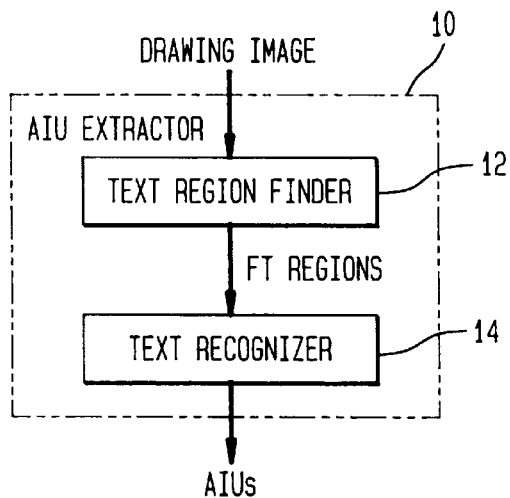
FIG. 1 is a flow chart showing basic operations of an AIU extractor.

Referring now in specific detail to the drawings in which like reference numerals identify similar or identical elements throughout the several views, and initially to FIG. 1, a flow chart shows the main steps in a drawing image AIU extractor. As discussed above, the input to the system is scanned images of engineering drawings. A first step 12 locates text boundaries and a second step 14 uses this input to extract the actual text content. Based on the appearance and underlying geometry and structure, first step 12 identifies these text areas. Text areas are identified by first extracting the mixed text/graphic (MTG) regions from raster images of engineering drawings, which are then filtered to extract the filtered text (FT) regions. See hereinafter for more details. In second step 14 an optical character recognition (OCR) toolkit is used to read the text content within these regions and the final output is the AIUs which are then sent to a hyperlinker for further processing. Each of steps 12 and 14 are interactive in the sense that should a computer make any mistakes, the user can go in and correct them.

Figure 2:
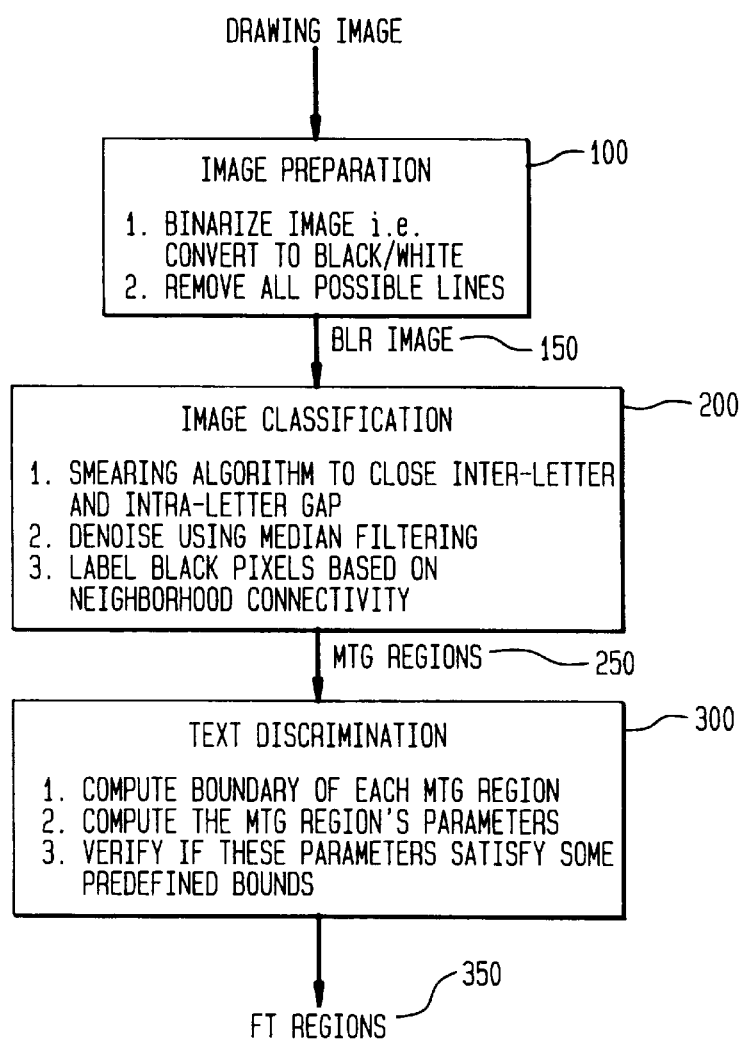
FIG. 2 is a flow chart showing the steps for finding and extracting text from a graphical drawing as in step 12 of the flow chart in FIG. 1.
Figure 6:
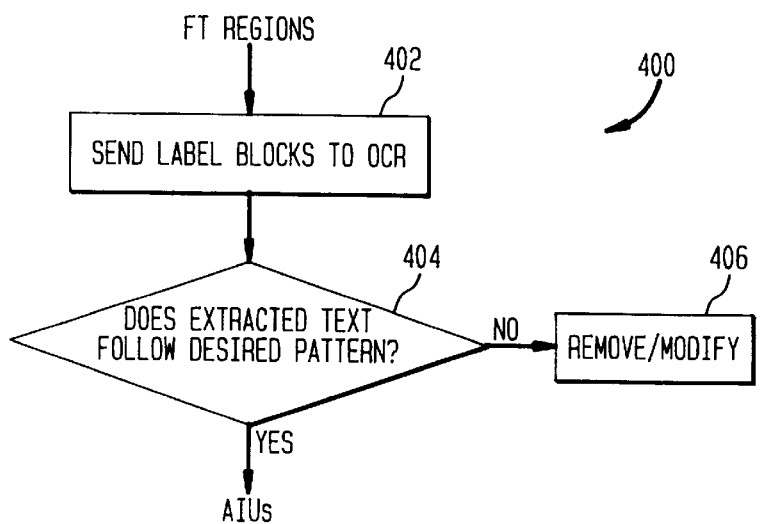
FIG. 6 is a flow chart showing the steps for text recognition as in step 14 of FIG. 1.

Referring now to FIG. 2, step 100 involves converting an image of an engineering drawing or document to binary format and cleaning up the resulting image for further processing. The input to the system is typically a raw raster image and the desired output is generally a Binarized Line-Removed (BLR) Image. Engineering drawings may be optically scanned to create a binarized image or the drawing may exist as an electronic file on a computer. FIG. 2 is associated with step 12, text region finder, of FIG. 1, and FIG. 6 is associated with step 14, text recognizer.

Figure 3:
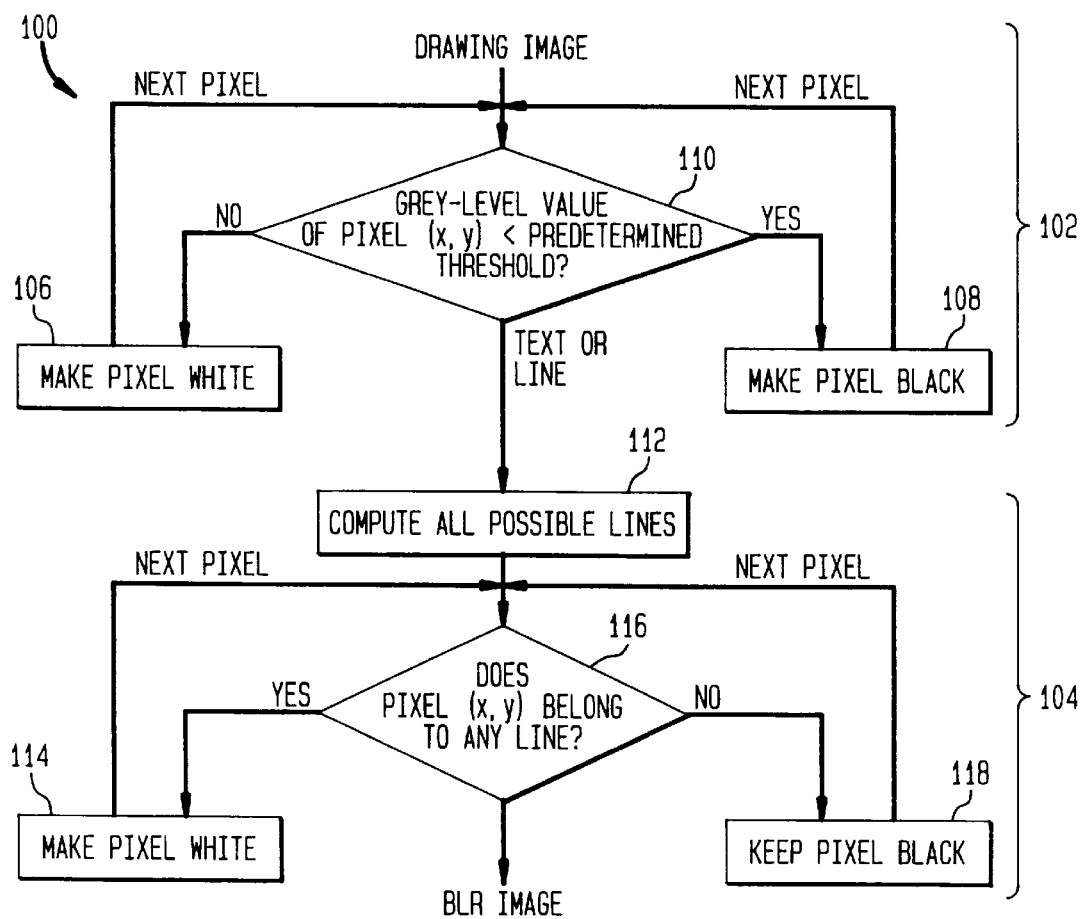
FIG. 3 is a flow chart showing substeps for performing step 100 of FIG. 2.

FIG. 3 shows more detail for step 100. For most engineering drawings or documents, the images are either grey-level or binary. In the case where they are binary, then a step 102 becomes redundant. Step 102 is still incorporated within the procedure because drawings are often not binary, or it is desired to operate on a smaller grey level image. Since grey level images are by definition multilevel, a smaller image can easily depict as much information as can be depicted within a bigger binary image. Converting from grey level to binary primarily involves thresholding. Thresholding includes assigning a grey-level value threshold as a reference to be compared to each individual pixel in a two dimensional document space x by y. The level is so selected that the background continues to be white and all the other pixels belonging to either the text or the line drawings appear as black. A step 110 compares the grey-level value of each pixel. If it is below the threshold value, it is assigned to be a black pixel in a step 108. If it above the threshold value, it is assigned to be a white pixel in a step 106. Step 102 is repeated for all pixels.

A step 104 is an optional step and is carried out only in a certain class of images. Step 104 is implemented only when the text and the line drawings are intermingled all over the document image. If there is a relative degree of separation that can easily be judged by the user, step 104 is omitted. Step 104 removes the lines from the drawings. This is done through the use of a Hough Transform which is described in U.S. Pat. No. 3,069,654 issued to P. V. C. Hough and is incorporated herein by reference. In parametric form, the equation of a line can be given as $x \cos(\theta) + y \sin(\theta) = \rho$. First, the parameter space $(\rho, \theta)$ is subdivided into a grid of cells. Every black pixel in the image is associated with a cell which has corresponding values of $\rho$ and $\theta$. Once all the black pixels are accounted for, a membership count for each cell in the $(\rho, \theta)$ plane is taken. Those cells which have a high count are considered as possible lines. After obtaining the equations of possible lines in a step 112, the image plane is revisited to see if indeed there is a line satisfying the equation given by the $(\rho, \theta)$ value passing through a particular black pixel in a step 116. In a step 114 and a step 118, the black pixel is replaced by a white one if it is found that the line is of a certain minimum length within a neighborhood of a particular black pixel. This cross-checking is necessary to rule out false alarms that might arise out of alignment of text strings or other non-line structures.

Referring back to FIG. 2, a step 200 includes image classification and grouping. Step 200 involves the use of a multi-step algorithm including smearing algorithms described in G. Nagy, S. Seth, and M. Viswanathan, "A prototype document image analysis systems for technical journals". IEEE Computer, 25:10–22, 1992. However, modifications to this algorithm need to be made for the type of documents handled. Text strings have a certain height that depends on the font size used. The spacing between black pixels which is related again to the font size and style, can in general be specified to satisfy a certain upper bound. Step 200 consists of the following the substeps described in FIG. 4.

Figure 4:
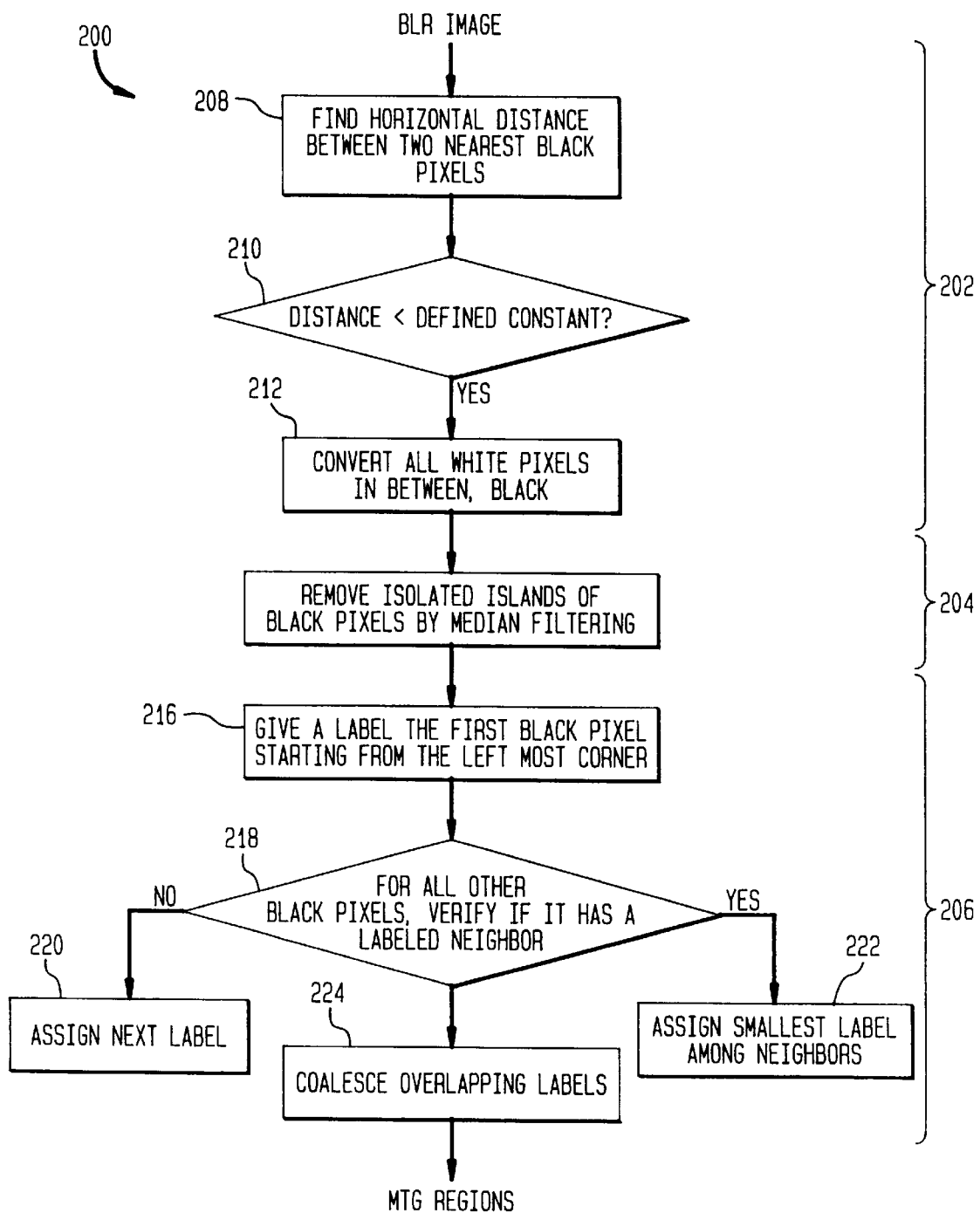
FIG. 4 is a flow chart showing substeps for performing step 200 of FIG. 2.

Referring to FIG. 4, a step 202 is uses the smearing algorithm. This operation is primarily engaged in the horizontal direction. A step 208 determines the distance between two nearest black pixels. For drawing images, where it is possible to have vertical lines of text, step 208 is performed in both horizontal and vertical directions. Within an arbitrary string of black and white pixels, white pixels are replaced by black pixels if the number of adjacent white pixels between two black pixels is less than a predetermined constant in a step 210 and a step 212. This constant is clearly related to the font-size and can be user-defined. The effect that step 202 has is that it closes all the gaps that exist between different letters in a word and reduce a word to a rectangular block of black pixels. However, it also affects the line drawings in a similar fashion. The difference here is that by the very nature of their appearance, text words after step 202 look rectangular of a certain height (for horizontal text) and width (assuming that the part numbers that appear in an engineering drawing are likely to be of a certain length). Fortunately, the line drawings generate irregular patterns making them discernible from associated text.

Since the line removal step 104 is likely to miss some lines, a step 204 can clean up the image after executing step 202 by running a median filtering operation. A median filtering for a vector g of size N (where the vector in this case consists of the image pixel and its neighbors) is given by:

$$median(g)=R_{[N/2]}(g)$$

where $R_{[N/2]}$ is the $N/2^{th}$ order statistic of g.

Depending on the size of the neighborhood chosen, step 204 removes small islands of black pixels which are not likely to have been detected due to the presence of an underlying text.

A step 206 is initiated after completion of step 204. A step 216 labels the black pixels in order to be able to identify each block separately. A modified version of a standard technique is used whereby as the first line is scanned from left to right, a label 1 is assigned to a first black pixel. This label is propagated repeatedly in a step 218. A step 222 assigns the smallest label amongst neighboring black pixels to subsequent adjacent black pixels, i.e. subsequent black pixels are labeled identically. This propagation stops in a step 220 when a first white pixel is encountered. The next black pixel is labeled 2 and is similarly propagated. This continues till the end of the first line is reached. For each black pixel on the second and succeeding lines, the neighborhood in the previously labeled lines along with the left neighborhood (on the same line) are examined and the pixel gets assigned the lowest label among them. If there are no labeled neighbors, the pixel gets a new label that has not yet been used. This procedure is continued until all the pixels in the image has been examined.

Even after step 218 has been completed, it is likely to have some adjacent black pixels that are labeled differently. So an iterative step 224 is initiated through the image to fuse such labels. The iteration is ended when a pass through the image results in no more label changes. At this point, a number of labeled regions exist. However, they might have originated as a result of either text or line drawings and are thus called Mixed Text/Graphics (MTG) Regions.

Referring again to FIG. 2, a step 300 endeavors to filter out the text regions from the graphic regions. These regions are thus named as Filtered Text (FT) Regions.

Figure 5:
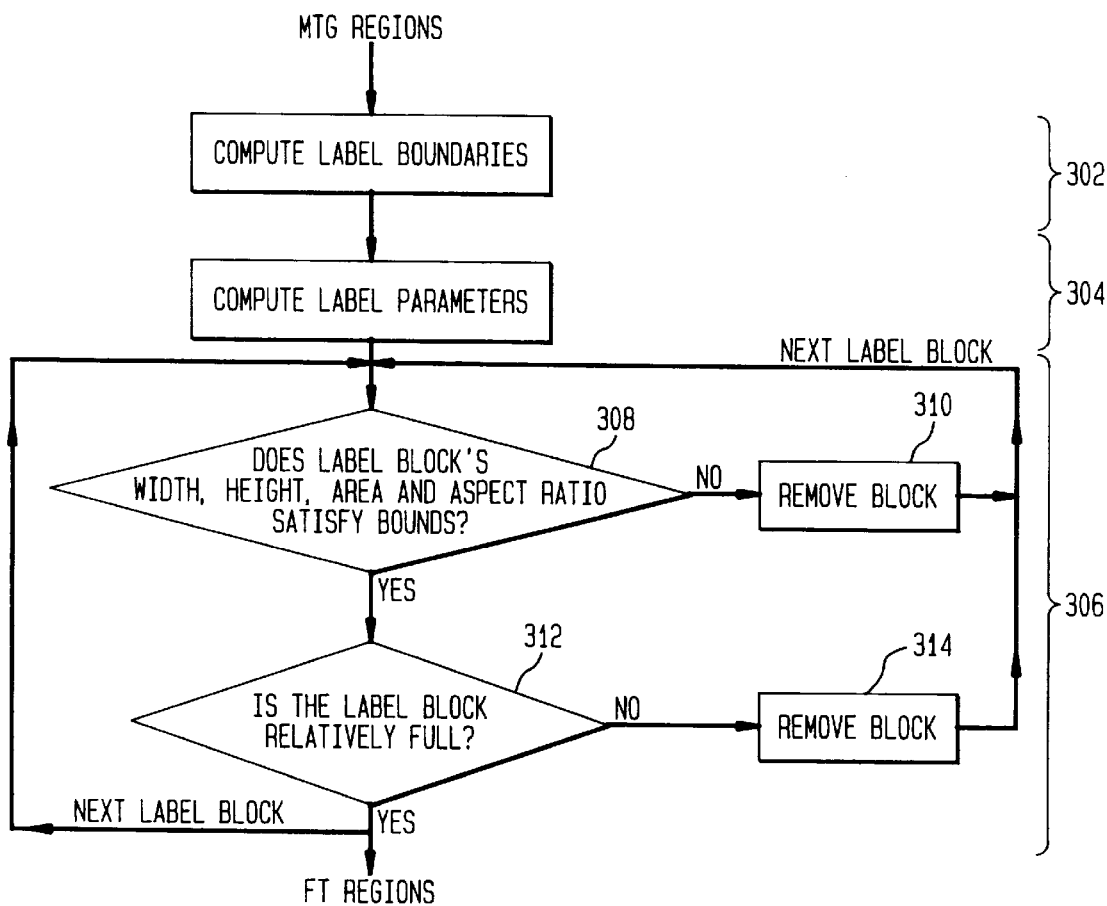
FIG. 5 is a flow chart showing substeps for performing step 300 of FIG. 2.

Referring now to FIG. 5, a step 302 can be partly combined with the previous step. Step 302 involves finding text boundaries, i.e. the procedure of text discrimination. Step 302 needs to first calculate the following properties of the MTG Regions. Step 302 involves the calculation of a bounding box around the different MTG Regions to filter out the text regions. A table is created that stores the coordinates of the bounding box and the number of black pixels within each box, i.e. the number of pixels belonging to that label. The main objective is to extract the bounding box. To that end, for each label assignment to a pixel (x, y), the following is computed:

$$xmin=min\ (x,\ x\ min)$$

$$xmax=max\ (x,\ x\ max)$$

$$ymin=min\ (y,\ y\ min)$$

$$ymax=max\ (y,\ y\ max)$$

Once the MTG Region boundary has been computed, we calculate the number of black pixels in each label by inspecting the area included within each bounding box.

After the region boundaries have been computed, a step 304 is included to compute the relevant parameters as follows:

1. The width and height of each block:

$$width=xmax-xmin$$

$$height=ymax-ymin$$

2. The aspect ratio of each block:

$$ar=width/height$$

3. The area of each block:

$$A=width \times height$$

4. The ratio of the number of black pixels to the surrounding area:

$$R=C/A$$

Based on step 304 text discrimination is carried out in a step 306 as described herein. A step 308 tests the label or region parameters against predetermined values in order to identify text blocks. Regions that are too small or too big are eliminated in a step 310, i.e. only accept regions that fall within a certain minimum and maximum area:

$$Amin \leq A \leq Amax$$

This removes a large number of false alarms. Usually part numbers can only be of a certain number of characters. Regions that have unexpectedly large or small width and height are also eliminated in step 310. The elimination criteria is:

$$widthmin \leq width \leq widthmax$$

$$heightmin \leq height \leq heightmax$$

Since text regions are desired, regions that appear square shaped can typically be eliminated. Rectangular regions are focused upon. This creates the following criteria: for horizontal text $ar \geq armin$ and for vertical text $1/ar \geq armin$. Regions that are relatively empty are also eliminated in a step 312 and a step 310, i.e. the black pixels that are connected in a rather irregular, non-rectangular way. This is the characteristic of line drawings and are unlikely to be associated with text strings. The criteria for this test is:

$$R \geq Rmin.$$

The limits in the above are domain dependent and the user has the ability to choose and modify them based on the characteristics of the document processed. The regions that satisfy all the above are declared as Fixed Text (FT)

Regions. Before they are processed further the user may have the option to correct for mislabeled text and also outline missed text.

Referring to FIG. 6, after the plausible text areas have been identified, a step 400 is to use an optical character recognition (OCR) toolkit to identify the ASCII text from the FT Regions. A step 402 basically necessitates getting the image data ready for the OCR software. To speed up the process, the previous text boundary extraction is carried out on a smaller scaled down version of the image. However, to get satisfactory results, we need the OCR to operate on the actual version of the scanned image. Thus the FT Regions extracted previously need to be scaled appropriately. The FT Region boundaries are also slightly enlarged to assure proper focus for the OCR. Also the user may have the capability at this stage to define other parameters that might affect the performance of the OCR.

A step 404 corrects any systematic error that might occur in the OCR. If the user is aware of the structure of the part numbers that are to be recovered, then the structure can be specified, for example, regular expressions, and check to see if indeed the output of the OCR satisfies such structures. Otherwise the user can rectify the errors in a step 406. Once the OCR is applied and the results verified, the underlying extracted text is associated to each one of the blocks completing the creation of the AIU's. Having described preferred embodiments of a novel method for searching and extracting text information from drawings (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as delined by the appended claims.

Having thus described the invention with the details and particularity required by the patent laws, what is claimed and desired protected by Letters Patent is set forth in the appended claims:

What is claimed is:

1. A method for recognizing text in graphical drawings comprising the steps of:

creating a binarized representation of a drawing to form an electronic image of pixels;

discriminating text regions from lines in the image by determining a distance between each black pixel and nearest neighboring black pixels, grouping pixels into pixel blocks having a same label based on a relationship between the determined distance and a predetermined distance, and comparing the blocks with a predetermined format to identify text regions;

removing the lines from the image using a Hough Transform to create text only regions; and recognizing text in the text only regions.

2. The method as recited in claim 1 further comprising the step of optically scanning the drawing.

3. The method as recited in claim 1 wherein the step of creating a binarized representation includes the steps of comparing pixel values to a grey-scale threshold value and assigning the pixels to be either white or black.

4. The method as recited in claim 1 wherein the step of discriminating text regions includes the steps of:

comparing each distance to the predetermined distance; and assigning labels to pixels within the predetermined distance to form the pixel blocks having the same label.

5. The method as recited in claim 1 wherein the step of removing the lines includes the steps of:

subdividing the drawing space into a grid defining grid spaces;

counting black pixels associated with text and graphics lines in each grid space;

comparing a count of black pixels to a predetermined count for determine if the grid space contains a line; and removing lines by changing black pixels to white pixels.

6. The method as recited in claim 1 wherein the step of recognizing text in the text only regions includes using optical character recognition software.

7. The method as recited in claim 1 further comprising the step of cleaning up the image by median filtering.

8. The method as recited in claim 1 further comprising the step of creating anchorable information units from the text only regions for hypertext creation.

9. A method for recognizing text in graphical drawings comprising the steps of:

creating a binarized representation of a drawing to form an electronic image of black pixels and white pixels;

determining a distance between each black pixel and nearest neighhboring black pixels;

comparing each distance to a predetermined distance;

assigning labels to pixels within the predetermined distance to form pixel blocks having the same label; and comparing pixel blocks to predetermined text formats for identifying text regions;

removing the lines from the image using a Hough Transform to create text only regions; and recognizing text in the text only regions.

10. The method as recited in claim 9 further comprising the step of optically scanning the drawing.

11. The method as recited in claim 9 wherein the step of creating a binarized representation includes the steps of comparing pixel values to a grey-scale threshold value and assigning the pixels to be either white or black.

12. The method as recited in claim 9 wherein the step of removing the lines incudes the steps of:

subdividing the drawing space into a grid defining grid spaces;

counting black pixels associated with text and graphics lines in each grid space;

comparing a count of black pixels to a predetermined count for determine if the grid space contains a line; and removing lines by changing black pixels to white pixels.

13. The method as recited in claim 9 wherein the step of recognizing text in the text only regions includes using optical character recognition software.

14. The method as recited in claim 9 further comprising the step of cleaning up the image by median filtering.

15. The method as recited in claim 9 further comprising the step of creating anchorable information units from the text only regions for hypertext creation.

16. A method for recognizing text in graphical drawings comprising the steps of:

creating a binarized representation of a drawing to form an electronic image of black pixels and white pixels;

determining a distance between each black pixel and nearest neighhboring black pixels;

comparing each distance to a predetermined distance;

assigning labels to pixels within the predetermined distance to form pixel blocks having the same label; and comparing pixel blocks to predetermined text formats for identifying text regions;

subdividing the drawing space into a grid defining grid spaces;

counting black pixels associated with text and graphics lines in each grid space;

comparing a count of black pixels to a predetermined count for determine if the grid space contains a line;

removing lines by changing black pixels to white pixels to create text only regions;

recognizing text in the text only regions; and converting the text to hypertext for creating an anchorable information unit.

17. The method as recited in claim 16 further comprising the step of optically scanning the drawing.

18. The method as recited in claim 16 wherein the step of creating a binarized representation includes the steps of comparing pixel values to a grey-scale threshold value and assigning the pixels to be either white or black.

19. The method as recited in claim 16 wherein the step of recognizing text in the text only regions includes using optical character recognition software.

20. The method as recited in claim 16 further comprising the step of cleaning up the image by median filtering.

\* \* \* \* \*